B. J. CAFFERATA.
PLASTER SLAB MOLDING MACHINE.
APPLICATION FILED APR. 11, 1922.
1,430,885.
Patented Oct. 3, 1922.
2 SHEETS—SHEET 2.
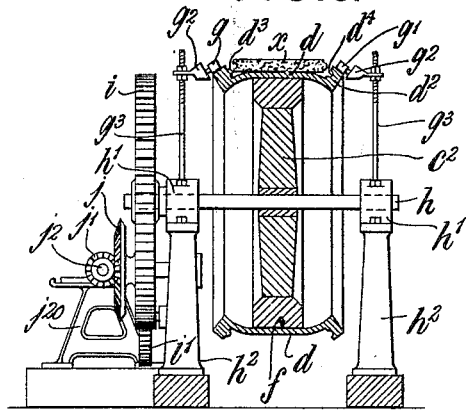
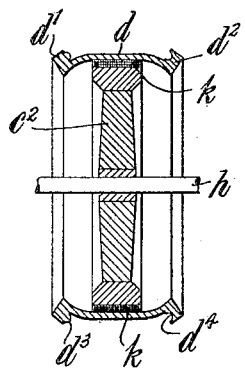
Inventor:
Bernard Joseph Cafferata.
Attorney:

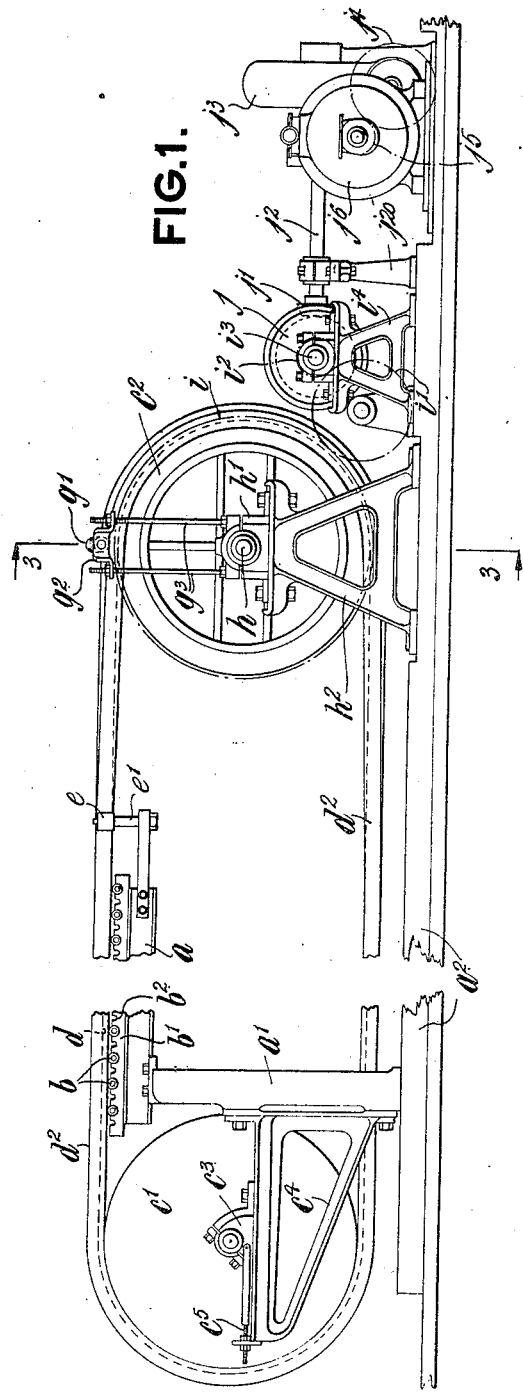

Patented Oct. 3, 1922.

1,430,885

UNITED STATES PATENT OFFICE.

BERNARD JOSEPH CAFFERATA, OF NEWARK-UPON-TRENT, ENGLAND.

PLASTER-SLAB-MOLDING MACHINE.

Application filed April 11, 1922. Serial No. 551,614.

*To all whom it may concern:*

Be it known that I, BERNARD JOSEPH CAFFERATA, of Newark-upon-Trent, in the county of Nottingham, England, a subject of the King of England, have invented certain new and useful Improvements in Plaster-Slab-Molding Machines, of which the following is a specification.

This invention relates to the manufacture of slabs, plates and the like (hereinafter referred to as slabs) of plaster, gypsum or similar plastic material, chiefly for building purposes, and the object is to simplify and expedite the production of said articles in a more or less continuous manner with a minimum of labour and at a relatively low cost.

In the specification of United States Letters Patent No. 1399485 there is disclosed an apparatus for the purpose above stated in which the material under treatment is charged into a mould, the base of which is formed by a conveyor movable over a table and having integral upstanding members constituting the lateral walls of the mould which are capable of movement away from the moulded slab, the conveyor being formed of resilient material and passed at the discharge end of the table about a roller having a transversely curved periphery whereby said upstanding members are caused to separate from the slab in the mould thus releasing the side edges of the slab and permitting the latter to be passed forward, for example to another conveyor on which it may be cut to desired sizes.

Now the present invention embodies a similar apparatus to the above but comprises a modification in the formation of the roller or pulley about which the conveyor passes at the discharge end and the arrangement of the conveyor thereon, in that the periphery of the said pulley or roller is not transversely curved as formerly but is flat or plane as in an ordinary driving or guiding pulley and the lateral edges of the conveyor including the upstanding mould wall members are caused to overlap the edges of said pulley in the transverse direction thereof.

An embodiment of the invention is illustrated in the accompanying drawings, in which:—

Fig. 1 is a side view of the machine with parts broken away. Fig. 2 is a plan view thereof also with parts broken away. Fig. 3 is a transverse section taken on the line 3—3 of Fig. 1, and Fig. 4 is a fragmentary detail cross section showing a modification.

As shown in the drawings the machine comprises the molding table $a$ of any desired length, supported by standards $a^1$ mounted on a base frame $a^2$, the upper surface of the table being constituted by a large number of transverse rollers $b$, of which alternate ones are shown for clearness, mounted for rotation in side plates $b^1$, provided with recesses $b^2$ for receiving reduced portions $b^3$ of the rollers, as will be readily understood. Over the said table and in contact with the rollers $b$ passes the upper run of an endless conveyor $d$ mounted on end rollers $c^1$ and $c^2$, the former being merely a guiding roller and shown as mounted in bearings $c^3$ on brackets $c^4$ carried by the end standards $a^1$ at the feed end of the machine. The bearings $c^3$ are adjustable for tensioning the conveyor by means of screw and nut devices $c^5$ of any suitable kind. The conveyor is in the form of a band of somewhat resilient material, such as vulcanized rubber, and has upstanding lateral flanges $d^1$ and $d^2$ shown more clearly in Figs. 3 and 4 forming the side walls of the mould, said flanges being respectively provided with a projection $d^3$ and recess $d^4$ to form the usual keying elements in the slabs to be moulded on the conveyor. At the discharge end of the molding table the conveyor is guided laterally and exteriorly by means of rollers $e$ carried by spindles $e^1$ mounted on the ends of arms $e^2$ projecting from the end of the table.

The other roller $c^2$ above referred to acts as the driving roller for the conveyor by means to be described later, and is located at a substantial distance from the adjacent end of the table. This roller as shown in Figs. 3 and 4, has a flat periphery $f$, about which the conveyor passes and is of such width that the lateral edges of the conveyor extend beyond the lateral edges of the roller whereby said over lapping edges of the conveyor will sag and the flanges $d^1$ and $d^2$ become separated to free the slab $x$ simply by the sagging at said overlapping edges due to the flexibility of the material of which the conveyor is formed. (See Figs. 3 and 4). The slab $x$ can thus be removed or passed forward for cutting into lengths or to be otherwise dealt with as may be required. At the line where the conveyor contacts with the curved periphery of the roller $c^2$ the upper surfaces of the flanges $d^1$ and $d^2$ may be acted on by conical rollers $g$, $g^1$, respectively to prevent the conveyor riding up off the roller, $c^2$, said conical rollers being shown as carried by straps $g^2$ adjustably mounted on the ends of rods $g^3$ extending vertically upwards from the bearings of said roller $c^2$.

In the modification shown in Fig. 4 there is shown as interposed between the periphery of the roller $c^2$ and the conveyor $d$ a layer of flexible material $k$ such as rubber felt or canvas to prevent the edges of the roller damaging or injuring the conveyor.

The roller $c^2$ is carried by a shaft $h$ mounted in bearings $h^1$ in side brackets $h^2$, and for the purpose of driving said roller to move the conveyor over the table the following means are shown:—

On the shaft $h$ is a large gear $i$ with which meshes a smaller gear $i^1$, which in turn meshes with a pinion $i^2$ on a shaft $i^3$ carried in a bracket $i^4$. On said shaft $i^3$ is a bevel wheel $j$ with which gears a smaller bevel wheel $j^1$ on the end of a shaft $j^2$, carried by bracket $j^{20}$, and which through suitable reducing gear contained in casing $j^3$ and through the gears $j^4$ and $j^5$ is driven from an electric motor $j^6$.

From the above description it will be apparent that the conveyor may receive a charge of plaster, cement or other material or compound fed thereto by any appropriate means (not shown), and that when same has sufficiently set, movement is imparted to the conveyor by the means described, and that as the conveyor passes about the periphery of the guiding and driving roller $c^2$ beyond the discharge end of the table, the lateral edges of the conveyor including the flanges $d^1$ and $d^2$ will sag where they overlap the edges of the roller and will free the lateral edges of the cast slab and permit the latter to be removed at will from the conveyor.

The extent of separation of the conveyor flanges $d$ $d^1$ or the point at which the same commences may to some extent be varied by controlling the tension of the conveyor between its supporting rollers.

What I claim as my invention and desire to secure by Letters Patent of the United States is:—

1. A plaster slab molding machine comprising a molding table, an endless conveyor movable over said table and constituting a continuous base for the mould, swinging members disposed one at each side of the conveyor to constitute mould walls, and a roller adjacent the delivery end of the table having a flat periphery about which the conveyor passes and beyond the lateral edges of which the conveyor extends to permit it to sag and move said swinging members apart.

2. A plaster slab molding machine comprising a molding table, an endless conveyor of resilient material movable over said table and constituting a continuous base for the mould, lateral upstanding members integral with said conveyor disposed one at each side thereof to constitute mould walls, and a roller adjacent the delivery end of the table having a flat periphery about which the conveyor passes and beyond the lateral edges of which the conveyor extends to permit it to sag and move said upstanding members apart whereby the lateral edges of the moulded slab are freed.

3. A plaster slab molding machine comprising a molding table, a plurality of transverse rollers forming the upper surface of said table, an endless conveyer of resilient material movable over said rollers, and constituting a continuous base for the mould, lateral upstanding members integral with the conveyor disposed one at each side thereof to constitute mould walls, a roller adjacent the delivery end of the table, having a flat periphery about which the conveyor passes and beyond the lateral edges of which the conveyor extends to permit it to sag to move said upstanding members apart and free the lateral edges of the moulded slab, and mechanism for driving said last mentioned roller whereby the conveyor is moved over the table.

In witness whereof I have signed this specification in the presence of two witnesses.

BERNARD JOSEPH CAFFERATA.

Witnesses:
  ALFRED CLARKE,
  ADA COLLINGWORTH.